July 25, 1933.  P. H. HUTCHINSON  1,919,434
GAUGING MACHINE
Filed Sept. 5, 1928

INVENTOR:
PHILIP H. HUTCHINSON
BY Gales P. Moore
his ATTORNEY

Patented July 25, 1933

1,919,434

UNITED STATES PATENT OFFICE

PHILIP H. HUTCHINSON, OF MONTCLAIR, NEW JERSEY, ASSIGNOR TO GENERAL MOTORS CORPORATION, OF DETROIT, MICHIGAN, A CORPORATION OF DELAWARE

GAUGING MACHINE

Application filed September 5, 1928. Serial No. 304,013.

This invention relates to gauging machines and comprises all the features of novelty herein disclosed in connection with a machine for gauging and segregating cylindrical rollers for diameter.

An object of the invention is to provide an improved gauging machine for accurately and reliably measuring dimensions, more especially diameters of cylinders. Another object is to provide an improved machine for segregating articles in accordance with their size. Another object is to provide an electrically controlled gauge which is reliable and sensitive to small differences in the size of the articles. To these ends and to improve generally and in detail upon devices of this character, the invention further consists in the various matters hereinafter disclosed and claimed.

Figure 1:
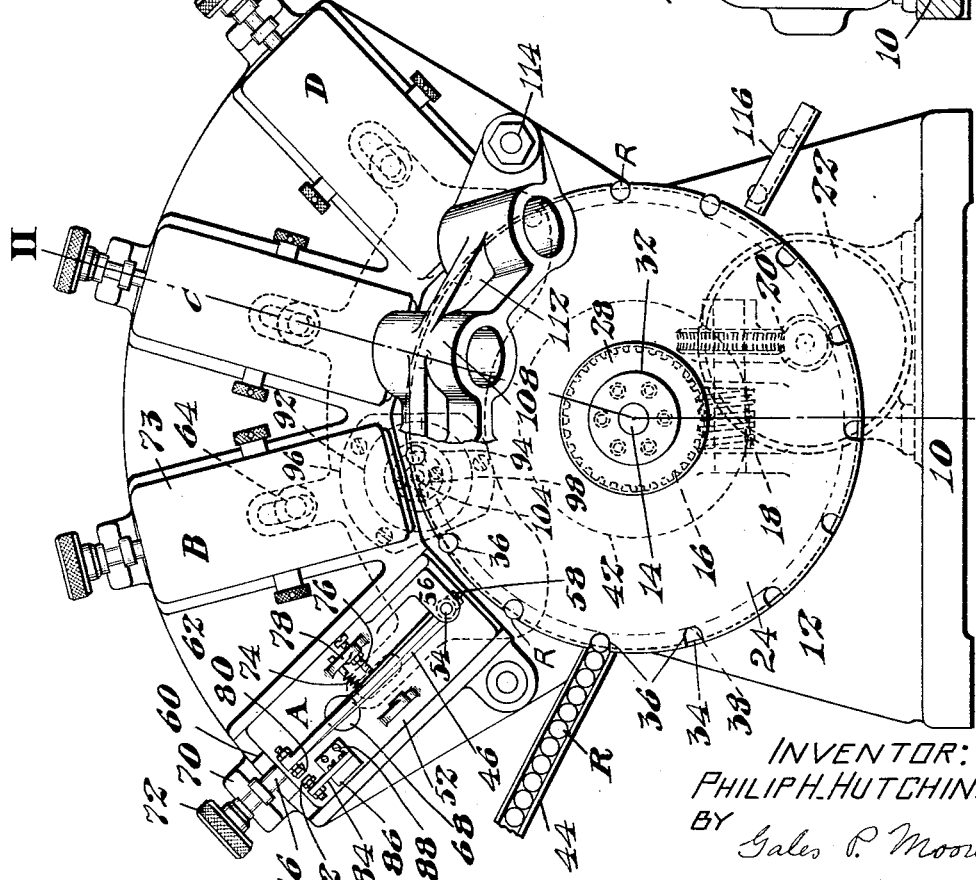

In its broader aspects, the invention is not necessarily limited to the specific constructions selected for illustrative purposes in the accompanying drawing in which Fig. 1 is a front elevation with one of the gauge covers and other parts cut away or removed.

Figure 2:
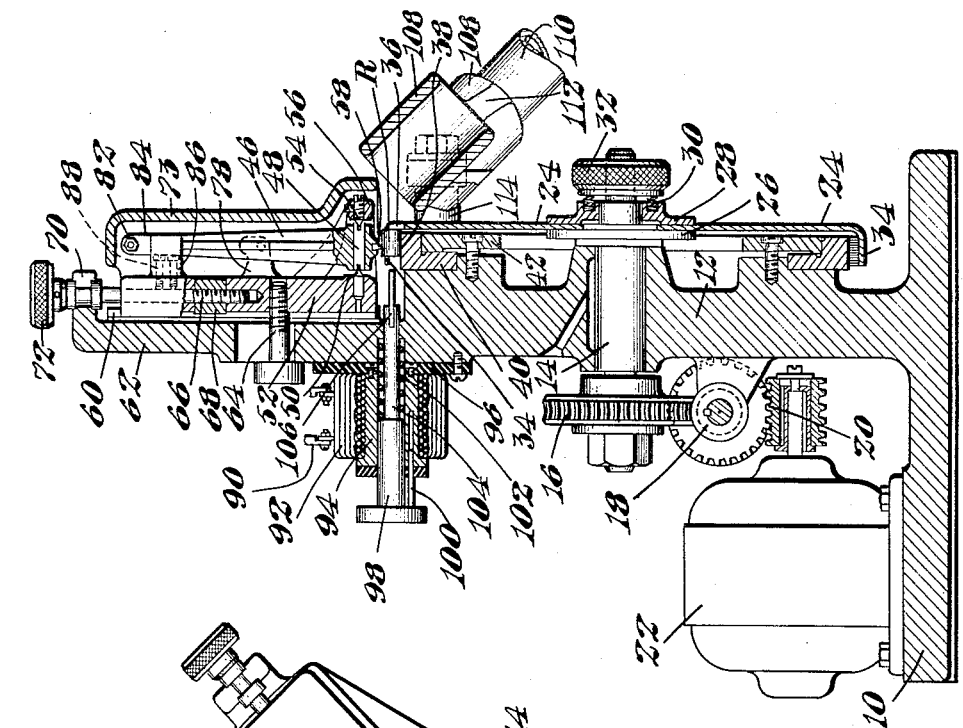

Fig. 2 is a sectional view approximately on the line II—II of Fig. 1.

The machine comprises a frame having a base 10 and an upright standard 12 in which a shaft 14 is journalled for rotation at slow speed by a worm wheel 16, worm gears 18 and 20, and an electric motor 22 mounted on the base. A feed disc or carrier 24 is held against a collar 26 on the shaft by a plate 28 carrying coil springs 30 abutting against a thrust washer at the rear of a nut 32 threaded on the shaft. This structure provides a friction drive for the feed disc 24 which has an inwardly extending peripheral flange 34 cut at intervals to provide a series of openings or recesses 36 for the rollers R or other articles to be gauged. The rollers roll on a cylindrical gauging plate 38 comprising a ring having a flange 40 clamped to the frame by a clamping ring 42. Rollers are supplied in any suitable way to an inclined chute 44 which conducts them to the openings 36 in the feed disc and the feed disc elevates the rollers and carries them in succession to a series of gauging devices A, B, C and D.

All gauging devices are preferably alike, though differently set to classify the articles and each comprises a gauge lever 46 bored near its lower end to receive a pin 48 having end openings, one opening to engage a cone pointed pivot pin 50 set in a recess of a slide 52 and the other to engage a cone pointed pivot screw 54 adjustably clamped by a set screw in a bracket 56 of the slide. Each lever carries a diamond gauge point 58 on its short arm, the articles being gauged between this point and the gauging plate 38. Each slide is adjustable along a dovetail slideway 60 on an arcuate extension 62 of the frame and clamped in adjusted position by a locking screw 64. The slide is adjustable to set the gauge point at a predetermined distance from the gauge plate by a screw 66 threaded in a nut 68 set in a round hole of the slide, the screw being held from endwise movement by integral collars which straddle a slotted lug 70 on the extension 62 and the screw being turned by a milled knob 72. Each gauge is housed within a cover plate 73 detachably secured to the slide.

Each gauge lever 46 is normally held in a radial position with respect to the gauge plate and feed disc, a coil spring 74 pressing it against a stop screw 76 adjustably fixed to lug 78 of the slide. When an article engages the diamond gauge point 58, it swings the gauge lever 46 in the plane of the article path to make an electric contact which controls ejecting and sorting mechanism for the article. The gauge point moves substantially tangentially of the gauge plate and so does not appreciably increase its distance therefrom and yet the lever can have sufficient movement at its upper end to make reliable electric contact. The long arm of the lever carries a contact screw 80 arranged opposite a contact screw 82 on a spring 84 carried by a block of insulation 86 fastened by screws 88 to the slide. Contact of the screws completes an electric circuit through wires 90 leading to the coils of a magnet 92 mounted on a flanged bushing 94 secured to an insulating disc 96 fastened to the frame. A reciprocating plunger 98 slides in the bushing and is held from rotation by a guide pin 100 attached to its head. Energizing the magnet pulls the plunger one way and a coil spring 102 pushes it back. The spring surrounds a rod 104 forming a part of the plunger and carrying an ejector plate 106 which pushes the article endwise out of gauging position and into a sleeve 108 from which a pipe or chute 110 conducts the article to a bin. All the sleeves 108 for the different stations are a part of a single casting 112 attached by studs 114 to the frame and each sleeve has a pipe leading to a bin. Articles which are too small to actuate any of the gauges are carried around in the recesses of the feed disc and fall out into a suitable chute 116.

In the preferred method of operation, the gauges are individually set by masters. At the first station A, the setting is such as to reject all rollers that are too large. At station B, the setting is such as to eject high limit articles and segregate them. Medium limit articles are ejected and segregated at station C and low limit articles are ejected and segregated at station D. The articles that are too small never actuate any of the gauges and go to chute 116 and of course no article actuates more than one gauge because it is ejected at the first station where the setting of the gauge point is near enough to the gauge plate to lie in the path of that particular article. Extremely accurate gauging and classifying of the articles is possible because the lever is radially placed and can swing enough to make reliable electric contact without the diamond gauge point having to appreciably increase its distance from the gauge plate.

I claim:

1. In a gauging machine, an arcuate gauge plate, a gauge beyond the periphery of said gauge plate, a disc having a flange outside the periphery of the gauge plate, the disc and flange having article receiving openings, and means for rotating the disc; substantially as described.

2. In a gauging machine, an arcuate gauge plate, a gauge, a disc having a flange outside the periphery of the gauge plate, the disc and flange having article receiving openings, means for rotating the disc, and an ejector movable across the gauge plate and laterally of the disc for expelling articles from the openings; substantially as described.

3. In a gauging machine, a frame having a cylindrical gauge plate, a series of gauges arranged radially outside the periphery of the gauge plate, a rotary carrier for causing articles to roll along the gauge plate to the gauges, a series of ejectors arranged at one side of the gauge plate, and a series of chutes at the other side of the gauge plate; substantially as described.

4. In a gauging machine, a frame having a cylindrical gauge plate, a series of gauges arranged radially outside the periphery of the gauge plate, a series of ejectors arranged at one side of the gauge plate, a series of chutes at the other side of the gauge plate, and a carrier extending between the ejectors and chutes for moving articles over the gauge plate to the gauges; substantially as described.

5. In a gauging machine, an upright frame carrying a cylindrical gauge plate, a vertical carrier having peripheral openings to receive articles and carry them over the outer periphery of the gauge plate, a series of slides radially arranged with respect to the gauge plate and carrier, and gauges carried by the slides; substantially as described.

6. In a gauging machine, a frame, a plate attached to the frame and having a cylindrical gauging surface, a rotary carrier mounted on the frame and having article engaging means traversable around the cylindrical gauging surface, the gauging surface being out of the vertical whereby the article rests against it by gravity, a gauge mounted on the frame outside and above the cylindrical surface and having an article operated gauge point movable substantially in the direction of movement of the articles, and a contact member movable under control of the gauge point to complete an electric circuit; substantially as described.

7. In a gauging machine, an upright frame, a ring attached to the frame and having a cylindrical gauging surface, a rotary disc at one side of the ring and having an article engaging portion at the outer periphery of the gauging surface, gauges arranged around the outer periphery of the gauging surface, and article ejectors arranged at the side of the ring opposite to the rotary disc; substantially as described.

8. In a precision gauging machine, a gauge plate having a convexly curved gauging surface presented upwardly and along which articles are traversed in gravity contact, a gauge spaced above the gauging surface, a carrier having a flange surrounding the gauging surface and provided with article receiving openings, means for actuating the carrier, and an ejector at one side of the gauge plate and movable laterally into the openings and across the gauging surface for expelling articles; substantially as described.

9. In a precision gauging machine, a gauge plate having a convex gauging surface presented upwardly and along which articles are traversed in gravity contact, a movable gauge spaced above said gauging surface, a rotary carrier having a member surrounding the gauging surface and provided with article openings which are open in both directions crosswise of the gauging surface, an ejector at one side of the gauge plate, and means controlled by the gauge for moving the ejector into the carrier openings to expel articles laterally across the gauging surface; substantially as described.

10. In a precision gauging machine, a gauge plate having a convex gauging surface presented upwardly and along which articles are traversed in gravity contact, a movable gauge spaced above said gauging surface, a rotary carrier having a member surrounding the gauging surface and provided with article openings which are open in both directions crosswise of the gauging surface, an ejector at one side of the gauge plate, and means controlled by the gauge for moving the ejector into the carrier openings to expel articles laterally across the gauging surface, the carrier openings also being open upwardly away from the gauging surface to receive the articles by gravity in such openings and to provide for access of the articles to the gauge; substantially as described.

11. In a precision gauging machine, a gauge plate having a convex gauging surface presented upwardly and along which articles are traversed in gravity contact, a plurality of gauges mounted above the gauging surface, a carrier having a member surrounding the gauging surface and provided with article openings open upwardly for access of the articles to the gauges and open laterally in both directions crosswise of the gauging surface, a plurality of ejectors associated with the gauges, and electric control means operated by contact of an article with a gauge for moving the corresponding ejector into a carrier opening to expel the article laterally from the gauging surface; substantially as described.

PHILIP H. HUTCHINSON.